AUTOMATIC GAIN CONTROL CIRCUIT USING PLURAL TIME CONSTANT MEANS

Filed Sept. 19, 1961

INVENTOR
D. MUIR, III
BY
ATTORNEY

United States Patent Office 3,109,989
Patented Nov. 5, 1963

3,109,989

AUTOMATIC GAIN CONTROL CIRCUIT USING PLURAL TIME CONSTANT MEANS

David Muir III, Middletown, N.J., assignor to Bell Telephone Laboratories, Incorporated, New York, N.Y., a corporation of New York Filed Sept. 19, 1961, Ser. No. 139,103
6 Claims. (Cl. 325—410)

Figure 1:
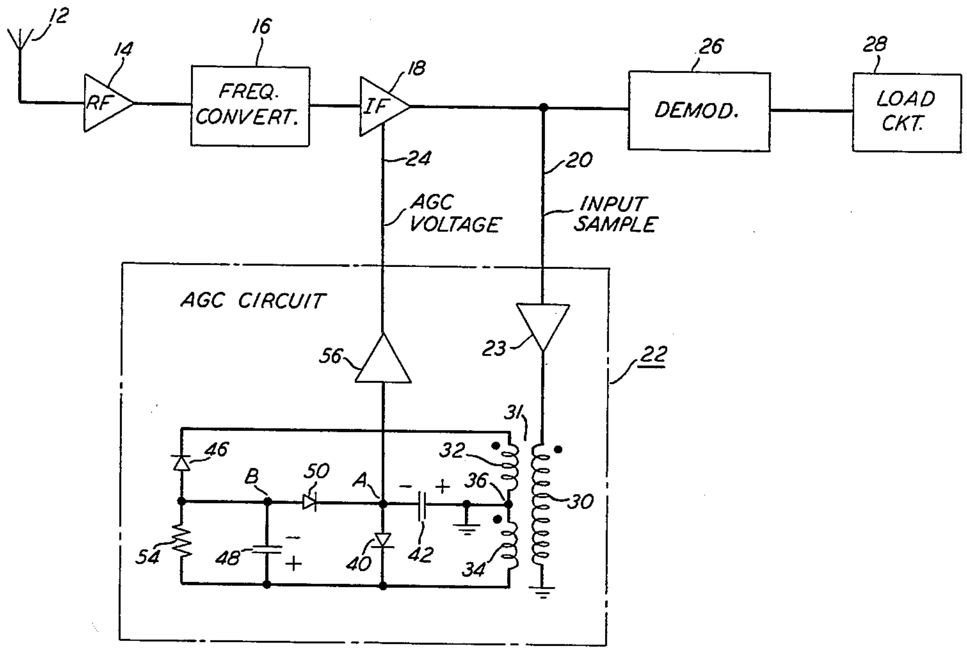

This invention relates to automatic gain control circuitry and, more particularly, to such circuits for producing automatic gain control in receivers for intermittent information signals.

Automatic gain control is a much-practiced technique for maintaining the signal level at a communications receiver constant despite variations in the level of the signal intercepted by the receiver. According to the usual practice, a sample of the signal whose level is to be controlled is abstracted from the receiver signal path, a direct-current voltage is developed therefrom proportional to the signal level, and the direct-current voltage is applied to one or more amplifier stages in the receiver signal path to adjust the gain of the amplifiers to counteract variations in the level of the received signal. The circuits for producing an automatic gain control voltage in continuous signaling systems usually comprise a rectifier, a capacitor, and a discharge resistor connected together in one of various arrangements. The asymmetrical nature of the rectifier causes the capacitor to charge to a direct-current voltage representative of the applied signal.

This practice, however, is generally found unsatisfactory for automatic gain control circuits that operate upon intermittent signals such as suppressed carried signals and carrier frequency pulse signals. It is characteristic of these intermittent signaling systems to deliver information to the receiver in "bursts." During the time intervals between signal bursts, if a conventional automatic gain control circuit is employed, the voltage across the capacitor decays through the discharge resistor with the result that the automatic gain control voltage is not continually an accurate representation of the signal level. This in turn subjects the controlled amplifier stages of the receiver to unwarranted increases in gain, thereby defeating the purpose of automatic gain control and rendering performance unacceptable.

In the past the above problem in intermittent signaling systems has been approached by providing an automatic gain control circuit in which the capacitor storing the automatic gain control voltage has a conditional discharge path so that the decay of the automatic gain control voltage may be controlled. The discharge path is controlled by a second capacitor also charged by the signal to a voltage representative of its level. In operation, the discharge path of the first capacitor remains inoperative preventing decay of the automatic gain control voltage until the voltage across the second capacitor decays to a predetermined voltage value with respect to the voltage across the first capacitor at which time the discharge path for the first capacitor is rendered operative and accordingly the first capacitor discharges. In this way, the charge on the first capacitor may be maintained between signal bursts by prescribing a sufficiently large time constant for the discharge path of the second capacitor relative to the time interval between bursts. Typical of the described type of automatic gain control circuit is the one disclosed in B. A. Trevor Patent 2,957,074, issued October 18, 1960.

These automatic gain control circuits perform adequately and promptly in response to increasing signal level. In that situation, the first capacitor simply charges to the new, higher level through the rectifier. On the other hand, when the signal level decreases, due to fading for example, the above circuit has difficulty in following the diminution in signal level. The first capacitor has no discharge path until the second capacitor first decays to a predetermined voltage so no means are available to reduce the voltage across the first capacitor unless long periods of time elapse between signal bursts. To improve the response of this circuit arrangement to diminishing signal level, the time constant of the second capacitor discharge path must be reduced. This course of action, as indicated above, adversely affects the ability of the circuit to adequately maintain the magnitude of the automatic gain control voltage between signal bursts. Consequently, the shortcomings of the conventional automatic gain control circuits crop up in the circuit arrangement adapted for intermittent signals when attempts are made to improve its response to decreasing signal level.

It is, therefore, the object of the present invention to simplify and improve automatic gain control circuits that operate upon intermittent signals and particularly to improve the response of such circuits to a diminishing signal level.

In accordance with the above object, a capacitor across which an automatic gain control voltage is extracted is charged during alternate half cycles of signal bursts to a direct-current voltage representative of the level of an applied intermittent signal. This capacitor is provided with a conditional discharge path which is controlled by the sum of the voltage developed across a second capacitor, charged by either the same or complementing alternate half cycles of the signal bursts, and a portion of the intermittent signal from which the automatic gain control signal is derived. When this sum falls below a predetermined value relative to the voltage across the automatic gain control capacitor, the conditional discharge path is rendered operative. During each interval of signal absence, the second capacitor discharges sufficiently so that upon reception of a new signal burst the sum of these voltages (i.e., the new signal burst and the voltage across the second capacitor) sinks below the predetermined value during peaks of the cycle of the signal burst of polarity opposite to that of the half cycles that charge the automatic gain control capacitor, thus activating the conditional discharge path to permit discharge of the automatic gain control capacitor. Upon the reception of each new signal burst the automatic gain control capacitor charges and discharges in this fashion on complementing half cycles to readjust promptly to the new level whether it be higher, lower, or the same as the level of the previous signal burst.

Figure 2:
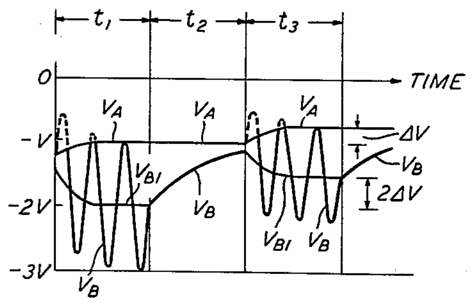

The above and other features of the invention will be considered in detail in the following specification taken in conjunction with the drawings in which:

FIG. 1 depicts automatic gain control circuitry arranged in accordance with the invention in schematic form in the environment of a radio receiver, and FIG. 2 illustrates the response at various points of the schematic automatic gain control circuit of FIG. 1 to an intermittent signal.

In FIG. 1 the automatic gain control circuitry of the invention is shown as deriving an automatic gain control voltage for regulating the gain of a radio receiver. Intermittent information signals situated in the radio frequency spectrum, i.e. above baseband frequency, as for example carrier frequency pulse or suppressed carrier signals, are intercepted by an antenna 12 and applied to a radio-frequency amplifier 14 which amplifies and filters the signal received by antenna 12. The radio-frequency signal is translated to an intermediate frequency by a frequency converter 16 after which it is applied to an intermediate-frequency amplifier 18 which again amplifies and filters the desired signal. A portion of this intermediate-frequency signal is abstracted on a lead 20 and applied as an input sample to automatic gain control circuit 22 from which a direct-current voltage representative of the intermediate-frequency signal level present at the output of amplifier 18 is derived. This automatic gain control voltage is transmitted over lead 24 to the gain control element (not shown) of intermediate-frequency amplifier 18 whereat, in accordance with well-known principles, the gain of amplifier 18 is adjusted to counteract changes in the level of the signal traversing the receiver signal path. The main portion of the intermediate-frequency signal from amplifier 18 is conveyed along the receiver signal path to a demodulator 26 from which the baseband information signal is made available for application to a load circuit 28.

In automatic gain control circuit 22 the input sample is amplified by an amplifier 23 and applied across a primary winding 30 of an input transformer 31. This signal is coupled in like phase to identical secondary windings 32 and 34 of input transformer 31. Windings 32 and 34 have a common terminal 36 which is connected to ground. On positive excursions of the signal appearing across primary winding 30, the voltage induced in winding 34 charges a capacitor 42 through a rectifier shown as diode 40, to a voltage equal to the peak voltage appearing across winding 34 in a well-known manner. On negative excursions of the signal appearing across primary winding 30, the voltage induced in the complete secondary winding, i.e. across both windings 32 and 34 in series, charges a capacitor 48 through a rectifier, shown as diode 46, to a voltage equal to the peak across the entire secondary winding (twice the voltage across capacitor 42). Diodes 46 and 40 could be poled to charge capacitors 48 and 42, respectively, on half cycles of the signal appearing across winding 30 of the same, rather than opposite, polarity. This arrangement generally does not prove as satisfactory, however, because it more severely loads the source that drives it than does the arrangement shown in FIG. 1. A discharge resistor 54, connected in parallel with capacitor 48, provides a permanent discharge path for capacitor 48. A conditional discharge path for capacitor 42 is formed by a rectifier, shown as a diode 50, also connected to ground through resistor 54 and winding 34. It will be noted that diode 50 is poled to present a high impedance path to ground for capacitor 42 so long as the voltage at point B is more negative than the voltage at point A. Hence, capacitor 42 does not discharge while this condition obtains. The automatic gain control voltage is taken from across capacitor 42, one terminal of which is connected directly to ground, and amplified in a direct-current amplifier 56 the output of which connects with lead 24.

In some instances performance of circuit 22 may be improved by inserting a resistor in series with diode 50 in the circuit branch between points A and B to impede somewhat the very rapid discharge of capacitor 42 when the conditional discharge path is operative due to the small forward resistance of practical diodes. The increased discharge time of capacitor 42 caused by the inserted resistor tends to "smooth out" the automatic gain control voltage produced across capacitor 42.

Reference is now made to FIG. 2 to illustrate the mode of operation of the circuit of the invention under various conditions. During the time period $t_1$ a carrier frequency burst is applied to primary winding 30 and capacitors 42 and 48 charge to steady state conditions representative of the level of the signal burst. The voltage across capacitor 42, represented by line $V_A$, is shown to be equal to $-V$ volts after steady state has been reached, V being the peak voltage of the carrier-frequency pulse appearing across winding 34. The voltage across capacitor 48, represented by line $V_{B1}$, after steady state has been reached is similarly equal to $-2V$ volts, 2V being the peak voltage across windings 32 and 34 taken in series. The voltage at point B with respect to ground is the sum of the voltage across capacitor 48 and that across winding 34. The voltage across winding 34, as previously stated, is a carrier-frequency pulse having a peak value of V volts. The voltage at point B, illustrated in FIG. 2 by line $V_B$, is a sinusoidal signal oscillating $\pm V$ volts about a direct-current voltage of $-2V$ volts after steady state is reached. Therefore, in the steady state the voltage at point A always exceeds or is at least equal to the voltage at point B and the conditional discharge path is inoperative.

During the next time period $t_2$, when no signal is being received, the voltage at point B decays exponentially as capacitor 48 discharges through resistor 54. So long as the voltage at point B remains more negative than the voltage at point A (this condition is desirable during period $t_2$ and the time constant of the discharge path of capacitor 48 is selected accordingly), the conditional discharge path of capacitor 42 remains inoperative and the voltage $V_A$ developed across capacitor 42 during the period $t_1$, representative of the level of the prior signal burst, is maintained.

When a new signal burst of smaller peak voltage ($V-\Delta V$ volts across winding 34, for example) is received in time period $t_3$, during some of the first peaks of the negative excursions thereof the voltage at point B is reduced in magnitude below that at point A. When this occurs, diode 50 conducts allowing capacitor 42 to discharge through resistor 54 to ground. The actual voltage at point B due to the clamping action of diode 50 will not rise much above that at point A. But so long as the projected voltage at point B, shown by the dashed portion of line $V_B$, remains above line $V_A$ the conditional discharge path remains operative. On the positive excursions of the signal burst during period $t_3$ capacitor 42 recharges through diode 40. Accordingly, capacitor 42 may alternately charge and discharge during time period $t_3$ until a new steady state condition, shown by line $V_A$, is reached indicative of the reduced signal level $V-\Delta V$ volts. At the same time, the voltage across capacitor 48 shown by line $V_{B1}$, is changed by its recharging the new steady state condition of $2V-2\Delta V$ volts and the peaks of the new signal burst no longer cross line $V_A$ of FIG. 2.

The circuit of FIG. 1, as with the prior art devices, encounters no difficulty in producing an automatic gain control voltage representative of an increasing signal level. Capacitor 42 simply charges to the new higher value representative of the increased signal level, through diode 40. As a result of the conditional discharge path becoming operative during every signal burst capacitor 42 can follow diminutions in signal lever as well, without necessitating a period between signal bursts sufficiently long for the voltage across capacitor 48 to decay to that of capacitor 42.

It should be noted that if the level of the signal burst during period $t_3$ in FIG. 2 is too small for the first few peaks of line $V_B$ to cross line $V_A$, line $V_{B1}$ will continue to decay until the peaks of the signal burst go above line $V_A$.

Generally, regardless of the extent or character of the change of signal characteristics the action described above will adjust the automatic gain control voltage to its proper value within a reasonable time of the start of period $t_3$. That this is true might be seen more easily by consideration of the steady state condition to which the circuit proceeds during a signal burst. In the steady state condition capacitor 48 will always assume a direct-current voltage equal to the peak voltage, $2V\pm2\Delta V$ volts, across both windings 32 and 34. The peak value of the signal burst superimposed upon the direct-current voltage at point B will be equal to $V\pm\Delta V$. Hence, unless the voltage across capacitor 42 is equal to $V\pm\Delta V$ volts, the value truly representative of the signal level, the peaks of the signal burst will rise above the voltage across capacitor 42, thus rendering the conditional discharge path operative. This, of course, as explained above, will drive capacitor 42 to a steady state condition where the voltage across it is equal to $V \pm \Delta V$ volts.

Although the operation of automatic gain control circuit 22 has been explained in connection with carrier frequency signals and it is such signaling systems which can perhaps most fully utilize the advantages of the invention, it is conceivable that baseband signals might be desired to be applied to automatic gain control circuit 22. In this case, automatic gain control circuit 22 will function substantially as described above with the peak fluctuations of the baseband information signal providing the voltage for controlling the conditional discharge path rather than the carrier frequency signals described above.

What is claimed is:

1. In a circuit for producing an automatic gain control voltage, a source of intermittent signals conveying information, a first storage element, means for charging said first storage element to a direct-current voltage indicative of the level of said signal, a conditional discharge path for said first storage element, a second storage element having a permanent discharge path, means for charging said second storage element to a voltage indicative of the level of said signal and larger than the voltage to which said first element is charged, means actuated by the sum of the voltage across said second storage element and said signal voltage during periods when said sum voltage assumes a predetermined value relative to the potential across said first storage element for completing said conditional discharge path, and an automatic gain control output circuit connected across said first storage element.

2. An automatic gain control circuit comprising a source of intermittent alternating-current signals, a first electric charge storage element, means driven by alternate half cycles of said signal for charging said first storage element to a direct-current voltage representative of the level of said signal, a conditional discharge path for said storage element, a second electric charge storage element having a permanent discharge path, means driven by alternate half cycles of said signal for charging said second storage element to a direct-current voltage indicative of the level of said signal and larger than the voltage to which said first element is charged, means actuated by the sum of the voltage across said second storage element and alternate half cycles of said signal voltage of polarity opposite of the half cycles that charge said first storage element during periods when said sum voltage exceeds the voltage across said first storage element for completing said conditional discharge path, and means for abstracting a control signal representative of the level of said signal from across said first storage element.

3. In a circuit for producing an automatic gain control voltage, a source of intermittent signals, a first capacitor, a circuit path operative to charge said first capacitor to a direct-current voltage indicative of the level of said signal, a second capacitor having a permanent discharge path, a circuit path operative to charge said second capacitor to a voltage larger than the voltage to which said first capacitor is charged, a discharge path for said first capacitor, said first capacitor discharge path being rendered operative during intervals of time when the sum of the voltage across said second capacitor and said signal voltage assumes a predetermined value relative to the voltage across said first capacitor, and an automatic gain control output circuit connected across said first capacitor.

4. In an automatic gain control circuit, a source of intermittent signals conveying information, a first capacitor, means for charging said first capacitor to a direct-current voltage proportional to the level of said signal, a second capacitor having a permanent discharge path, means for charging said second capacitor to a direct-current voltage proportional to the level of said signal and larger than the direct-current voltage across said first capacitor, a conditional discharge path including a rectifier connected between said first and second capacitors, means for applying a portion of said signal between the terminal of said second capacitor connected to said conditional discharge path and the terminal of said first capacitor unconnected to said conditional discharge path, whereby the sum of the voltage across said second capacitor and said portion of said signal upon attaining a predetermined value relative to the voltage across said first capacitor renders said conditional discharge path operative, and means for abstracting a signal from said first capacitor representative of the level of said signal.

5. An automatic gain control circuit comprising an input transformer having a secondary winding, a center tap on said secondary winding connected to ground, means for impressing intermittent signals across said transformer, a first diode and capacitor series combination connected for charging said first capacitor to a direct-current voltage equal to the peak voltage across said secondary winding, said capacitor having a permanent discharge path, a second diode and capacitor series combination connected for charging said second capacitor to a direct-current voltage equal to one half the peak voltage across said secondary winding, said second capacitor having one terminal connected to ground and a conditional discharge path comprising a third diode interconnecting said permanent discharge path of said first capacitor with said second capacitor whereby said third diode assumes a low resistance state during periods when the magnitude of the voltage at the junction of said first diode and capacitor exceeds that at the junction of said second diode and capacitor.

6. A circuit for producing an automatic gain control voltage comprising an input transformer, said input transformer having a secondary winding with a center tap, a first diode and the parallel combination of a resistor and a first capacitor connected in series across the end terminals of said secondary winding, a second diode and a second capacitor connected in series between one of said secondary winding end terminals and said center tap, said second capacitor having one terminal connected to said center tap, said second diode being poled to charge the terminal of said second capacitor connected to said second diode in the same polarity as the terminal at the junction of said first diode with said first capacitor is charged in response to signals applied to said input transformer, a third diode connected between the junction of said second diode with said second capacitor and said first diode with said parallel combination, said third diode being poled such that when said first and second capacitors are in a steady state condition said third diode is back biased.

References Cited in the file of this patent

UNITED STATES PATENTS

| | | |
|---|---|---|
| 1,931,866 | Heising | Oct. 24, 1933 |
| 2,957,074 | Trevor | Oct. 18, 1960 |